(12) United States Patent
Tang (10) Patent No.: US 11,729,819 B2
(45) Date of Patent: *Aug. 15, 2023

(54) METHOD AND DEVICE FOR DETERMINING CONTENTION WINDOW

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,814

(22) Filed: Mar. 29, 2022

(65) Prior Publication Data

US 2022/0225404 A1    Jul. 14, 2022

Related U.S. Application Data

(63) Continuation of application No. 16/942,610, filed on Jul. 29, 2020, now Pat. No. 11,350,446, which is a
(Continued)

(51) Int. Cl.
*H04W 74/00* (2009.01)
*H04W 76/28* (2018.01)
(Continued)

(52) U.S. Cl.
CPC ......... *H04W 74/008* (2013.01); *H04L 1/1819* (2013.01); *H04L 5/0055* (2013.01);
(Continued)

(58) Field of Classification Search
CPC ............... H04W 74/008; H04W 76/28; H04W 74/0825; H04W 16/14; H04W 72/0413; H04L 1/1819; H04L 5/0055
(Continued)

(56) References Cited

U.S. PATENT DOCUMENTS

| 10,887,914 B2 | 1/2021 | Hu et al. |
| 2017/0005768 A1 | 1/2017 | Yin et al. |

(Continued)

FOREIGN PATENT DOCUMENTS

| CN | 105578607 A | 5/2016 |
| CN | 107624265 A | 1/2018 |

(Continued)

OTHER PUBLICATIONS

Guangdong OPPO Mobile Telecommunications Corp. Ltd., First Examination Report, AU2018406782, dated Sep. 2, 2022, 4pgs.
(Continued)

*Primary Examiner* — Gbemileke J Onamuti
(74) *Attorney, Agent, or Firm* — Morgan, Lewis & Bockius LLP (57) ABSTRACT

Provided by an embodiment of the present application are a method and device for determining a contention window, the method comprising: according to feedback information sent by a terminal device, a network device determining the length of a contention window (CW) used for channel detection, the feedback information comprising feedback information corresponding to a physical downlink shared channel (PDSCH) sent by the network device on a first carrier wave; according to the length of CW, the network device performing channel detection on the first carrier wave.

19 Claims, 4 Drawing Sheets

200

According to feedback information sent by a terminal device, a network device determining the length of a contention window (CW) used for channel detection, the feedback information comprising feedback information corresponding to a physical downlink sharing channel (PDSCH) sent by the network device on a first authorization-free carrier — S210

According to the length of the CW, the network device performing channel detection on the first authorization-free carrier — S220

Related U.S. Application Data continuation of application No. PCT/CN2018/075063, filed on Feb. 2, 2018.

(51) Int. Cl.
| | | |
|---|---|---|
| *H04W 16/14* | (2009.01) | |
| *H04W 72/04* | (2023.01) | |
| *H04L 1/18* | (2023.01) | |
| *H04L 5/00* | (2006.01) | |
| *H04L 1/1812* | (2023.01) | |
| *H04W 74/08* | (2009.01) | |
| *H04W 72/21* | (2023.01) | |

(52) U.S. Cl.
CPC .......... *H04W 16/14* (2013.01); *H04W 72/21* (2023.01); *H04W 74/0825* (2013.01); *H04W 76/28* (2018.02)

(58) Field of Classification Search
USPC ......................................................... 370/329
See application file for complete search history.

(56) References Cited

U.S. PATENT DOCUMENTS

| | | |
|---|---|---|
| 2018/0175975 A1 | 6/2018 | Um et al. |
| 2018/0270860 A1 | 9/2018 | Bhorkar et al. |
| 2018/0352574 A1 | 12/2018 | Li et al. |
| 2019/0036831 A1 | 1/2019 | Guan |

FOREIGN PATENT DOCUMENTS

| | | |
|---|---|---|
| CN | 107637158 A | 1/2018 |
| CN | 107667496 A | 2/2018 |
| JP | 2018516003 A | 6/2018 |
| JP | 2018523333 A | 8/2018 |
| JP | 2018528638 A | 9/2018 |
| JP | 2019510443 A | 4/2019 |
| KR | 10-2017-0020238 A | 2/2017 |
| WO | WO2016182355 | 11/2016 |
| WO | WO2016182398 | 11/2016 |
| WO | WO2017004256 | 1/2017 |
| WO | WO2017030310 A1 | 2/2017 |
| WO | WO2017166222 A1 | 10/2017 |
| WO | WO2017167165 A1 | 10/2017 |

OTHER PUBLICATIONS

OPPO Guangdong Mobile Telecommunications Co. Ltd., Second Office Action,CN202110715823.2, dated Jul. 19, 2022, 14pgs.

Guangdong OPPO Mobile Telecommunications Corp. Ltd., Notice of Allowance, JP2020-541507, dated Jul. 15, 2022, 6pgs.

Guangdong OPPO Mobile Telecommunications Corp. Ltd., International Search Report and Written Opinion, PCTCN2018075063, dated Sep. 20, 2018, 11 pgs.

Guangdong OPPO Mobile Telecommunications Corp. Ltd., International Preliminary Report on Patentability, PCTCN2018075063, dated Aug. 14, 2020, 4 pgs.

Guangdong OPPO Mobile Telecommunications Corp. Ltd., First Office Action, CN202110715823.2, dated Apr. 13, 2022, 17 pgs.

Guangdong OPPO Mobile Telecommunications Corp. Ltd., Extended European Search Report, EP18904312.8, dated Nov. 20, 2020, 8 pgs.

Guangdong OPPO Mobile Telecommunications Corp. Ltd., Examination Report, IN202027035965, dated Nov. 17, 2021, 6 pgs.

Notice of Reasons for Refusal, JP2020-541507, dated Dec. 3, 2021, 12 pgs.

Guangdong OPPO Mobile Telecommunications Corp. Ltd., Notification of Reasons for Refusal, KR10-20207024383, dated Feb. 14, 2022, 13 pgs.

3GPP, TS 36.213, V14.3.0, Evolved Universal Terrestrial Radio Access (E-UTRA); Physical layer procedures (Release 14) Jun. 2017, 460 pgs.

Intel Corporation, Remaining Details on HARQ Feedback Based CW Adaptacion, 3GPP TSG RAN WG1 Meeting #83, R1-156511, Anaheim, CA, USA, Nov. 15-22, 2015, 5 pgs.

Tang, Office Action, U.S. Appl. No. 16/942,610, dated Aug. 27, 2021, 23 pgs.

Tang, Notice of Allowance, U.S. Appl. No. 16/942,610, dated Dec. 21, 2021, 9 pgs.

Guangdong OPPO Mobile Telecommunications Corp. Ltd., CN202110715 823.2, Decision of Rejection, dated Oct. 28, 2022, 12 pgs.

Guangdong OPPO Mobile Telecommunications Corp. Ltd., EP18904312.8, First Office Action, dated Nov. 9, 2022, 6 pgs.

| According to feedback information sent by a terminal device, a network device determining the length of a contention window (CW) used for channel detection, the feedback information comprising feedback information corresponding to a physical downlink sharing channel (PDSCH) sent by the network device on a first authorization-free carrier | S210 |

| According to the length of the CW, the network device performing channel detection on the first authorization-free carrier | S220 |

METHOD AND DEVICE FOR DETERMINING CONTENTION WINDOW

CROSS-REFERENCE TO RELATED APPLICATIONS

This application is a continuation application of U.S. application Ser. No. 16/942,610, filed Jul. 29, 2020, which is a continuation application of International Patent Application No. PCT/CN2018/075063, entitled "METHOD AND DEVICE FOR DETERMINING CONTENTION WINDOW" filed on Feb. 2, 2018, the entire content of both of which is incorporated herein by reference.

TECHNICAL FIELD

Embodiments of the present application relate to the field of communications and, more particularly, to a method and a device for determining a contention window.

BACKGROUND

In the licensed-assisted access system based on long term evolution (LAA-LTE), the terminal equipment is provided services with the carrier on the licensed spectrum as the main carrier and the carrier on the unlicensed spectrum as the secondary carrier. In the unlicensed spectrum, the communication equipment follows the principle of "Listen Before Talk (LBT)", that is, the communication equipment needs to conduct channel listening before sending signals on the unlicensed spectrum channel, and only can send signals when the channel listening result indicates that the channel is idle. If the channel listening result of the communication device on the channel of unlicensed spectrum indicates that the channel is busy, the communication device cannot send signals.

Before starting channel monitoring on the unlicensed carrier, a network device needs to maintain and adjust a length of contention window (CW) used for channel detection (or channel monitoring). For example, the network device can maintain or adjust the length of CW according to a proportion of negative acknowledgement (NACK) in feedback information.

However, the LTE-LAA system only supports the carrier aggregation (CA) scenario, and the feedback information is transmitted only through the licensed carrier. When the new radio (NR) technology is applied to the unlicensed carrier, the NR system on the unlicensed carrier supports both the CA scenario and the dual connection (DC) and standalone (SA) networking scenarios. In this case, the feedback information can be transmitted through the licensed carrier or through the unlicensed carrier. Accordingly, how to adjust the length of CW for channel detection is an urgent problem to be solved.

SUMMARY

Embodiments of the application provide a method and a device for adjusting CW being able to adjusting the length of CW according to feedback information corresponding to a physical downlink shared channel (PDSCH) on the unlicensed carrier.

According to a first aspect, there is provided a method for adjusting a CW, including: determining, by a network device according to feedback information sent by a terminal device, a length of CW used for channel detection, the feedback information including feedback information corresponding to the PDSCH sent by the network device on a first carrier, and the first carrier being an unlicensed carrier; and performing, by the network device, channel detection on the first carrier according to the length of CW.

Accordingly, before performing channel detection on the first carrier in the unlicensed carrier, the network device may determine the length of CW according to the feedback information corresponding to the PDSCH sent on the first carrier. For example, the network device may increase the length of CW when the proportion or the number of NACK in the feedback information is relatively large, or decrease the length of CW when the proportion or the number of NACK in the feedback information is relatively small, thereby enabling flexible adjustment of the CW and, further, enabling fair coexistence between different communication systems (e.g., NR-U system, LAA-LTE system and WIFI system).

Optionally, the number of the terminal device may be one or more. In other words, the feedback information used for determining the length of CW may be fed back by one or more terminal devices. Embodiments of the present application are not limited thereto.

Optionally, in an embodiment of the present application, the feedback information may include at least one of hybrid automatic repeat request (HARQ) information, channel quality indication (CQI), precoding matrix indication (PMI) or codebook, rank indication (RI), scheduling request (SR), or other feedback information fed back by the terminal device. Embodiments of the present application are not limited thereto.

In some possible implementation manners, the feedback information includes all or part of feedback information transmitted in a physical uplink control channel (PUCCH) on a first time unit, the first time unit being a time unit on the first carrier or a time unit on a second carrier other than the first carrier.

In some possible implementation manners, the second carrier is an unlicensed carrier different from the first carrier; or the second carrier is a licensed carrier.

In some possible implementation manners, the first time unit includes:

all or part of a time unit used for transmitting the PUCCH in a last uplink transmission before the network device determines the length of CW; and/or all or part of a time unit used for transmitting the PUCCH in a second to last uplink transmission before the network device determines the length of CW.

In some possible implementation manners, the first time unit includes:

a headmost time unit used for transmitting the PUCCH in the last uplink transmission before the network device determines the length of CW; and/or a last time unit used for transmitting the PUCCH in the second to last uplink transmission before the network device determines the length of CW.

In some possible implementation manners, the feedback information includes all or part of feedback information transmitted in a physical uplink shared channel (PUSCH) on a second time unit, the second time unit being a time unit on the first carrier or a time unit on a third carrier other than the first carrier.

In some possible implementation manners, the third carrier is an unlicensed carrier different from the first carrier; or the third carrier is a licensed carrier.

In some possible implementation manners, the second time unit includes:

all or part of a time unit used for transmitting the PUSCH including the feedback information in a last uplink transmission before the network device determines the length of CW; and/or all or part of a time unit used for transmitting the PUSCH including the feedback information in a second to last uplink transmission before the network device determines the length of CW.

In some possible implementation manners, the second time unit includes:

a headmost time unit used for transmitting the PUSCH including the feedback information in the last uplink transmission before the network device determines the length of CW; and/or a last time unit used for transmitting the PUSCH including the feedback information in a second to last uplink transmission before the network device determines the length of CW.

In some possible implementation manners, the feedback information includes feedback information corresponding to a PDSCH on a third time unit.

In some possible implementation manners, the third time unit includes:

all or part of a time unit in a last downlink transmission performed on the first carrier before the network device determines the length of CW.

In some possible implementation manners, the third time unit includes:

a headmost time unit in a last downlink transmission performed on the first carrier before the network device determines the length of CW; or two preceding time units in the last downlink transmission performed on the first carrier before the network device determines the length of CW.

In some possible implementation manners, the feedback information corresponding to the PDSCH on the third time unit is transmitted through a licensed carrier.

In some possible implementation manners, the feedback information is hybrid automatic repeat request (HARQ) information, and the HARQ information includes at least one of following states:

positive acknowledgment (ACK), negative acknowledgment (NACK), discontinuous transmission (DTX) information, NACK or DTX information and any information.

In some possible implementation manners, determining, by the network device according to the feedback information sent by the terminal device, the length of CW used for channel detection includes:

determining, by the network device, to increase the length of CW when a proportion of NACK included in the feedback information is greater than or equal to a first preset value or a number of NACK included in the feedback information is greater than or equal to a second preset value; or determining, by the network device, to decrease or keep the length of CW when the proportion of NACK included in the feedback information is smaller than the first preset value or the number of NACK included in the feedback information is smaller than the second preset value.

Optionally, the first preset value is 80%.

In some possible implementation manners, when the feedback information is transmitted through an unlicensed carrier, the method further includes:

making the feedback information not counted when the network device fails to detect the feedback information on the unlicensed carrier; or counting the feedback information as NACK when the network device detects the feedback information on the unlicensed carrier and a state of the feedback information is one of DTX information, NACK or DTX information and any information.

According to a second aspect, there is provided a device for adjusting CW, configured to perform the method according to the first aspect or any possible implementation manner thereof. Specifically, the device includes a unit configured to perform the method according to the first aspect or any possible implementation manner thereof.

According to a third aspect, there is provided an apparatus for adjusting CW. The apparatus includes: a memory, a processor, an input interface, and an output interface. In an embodiment, the memory, processor, input interface and output interface are connected through a bus system. The memory is configured to store instructions, and the processor is configured to execute the instructions stored in the memory, so as to perform the method according to the first aspect or any possible implementation manner thereof.

According to a fourth aspect, there is provided a computer storage medium for storing computer software instructions, which are used for implementing the method according to the first aspect or any possible implementation manner thereof, and the medium includes a program designed to perform the forgoing method.

According to a fifth aspect, there is provided a computer program product including instructions which, when executed on a computer, causes the computer to implement the method according to the first aspect or any possible implementation manner thereof.

DETAILED DESCRIPTION

The technical solutions in this application will be described below with reference to the drawings.

The terms "component", "module", "system" and the like used in this specification are indicative of computer-related entities, hardware, firmware, a combination of hardware and software, software, or software in execution. For example, a component may be, but is not limited to, a process running on a processor, a processor, an object, an executable file, an execution thread, a program, and/or a computer. By way of illustration, both the application running on the computing device and the computing device may be components. One or more components may reside in a process and/or an execution thread, and the components may be localized on one computer and/or distributed on two or more computers. In addition, these components may be implemented by various computer readable medium having various data structures stored thereon. The components may, for example, communicate through local and/or remote processes based on a signal having one or more data packets (e.g., data of two components from interaction with another component in a local system, a distributed system, and/or a network, such as the Internet that interacts with other systems through signals).

It should be understood that the embodiments of the present application may be applied to various communication systems, for example, Global System of Mobile Communication (GSM), Code Division Multiple Access (CDMA) system, Wideband Code Division Multiple Access (WCDMA) system, General Packet Radio Service (GPRS), Long Term Evolution (LTE) system, advanced long term evolution (LTE-A) system, LTE-based access to unlicensed spectrum (LTE-U) system, New Radio (NR) system and evolution system of NR system, such as NR-based access to unlicensed spectrum (NR-U) system, Universal Mobile Telecommunication System (UMTS), Wireless Local Area Networks (WLAN), Wireless Fidelity (WiFi) or next-generation communication systems and the like.

Generally speaking, traditional communication systems support a limited number of connections and are easy for implementation. However, with the development of communication technologies, mobile communication systems will not only support traditional communication, but also support, for example, device to device (D2D) communication, Machine to Machine (M2M) communication, Machine Type Communication (MTC), and Vehicle to Vehicle (V2V) communication.

The communication system in the embodiments of the present application may be applied to a carrier aggregation (CA) scenario, a dual connectivity (DC) scenario, or a standalone (SA) networking scenario.

When the communication system in the embodiments of the present application is applied to an unlicensed spectrum and the networking scenario is CA, the CA networking scenario may be that the primary carrier is on the licensed spectrum, the secondary carrier is on the unlicensed spectrum, and the primary carrier and the secondary carrier are connected via ideal backhaul.

When the communication system in the embodiments of the present application is applied to an unlicensed spectrum and the networking scenario is DC, the DC networking scenario may be that the primary carrier is on the licensed spectrum, the secondary carrier is on the unlicensed spectrum, and the primary carrier and the secondary carrier are connected via non-ideal backhaul. The system on the primary carrier and the system on the secondary carrier may belong to different systems. For example, the system on the primary carrier is an LTE system, and the system on the secondary carrier is an NR system. Alternatively, the system on the primary carrier may also belong to the same system as the system on the secondary carrier. For example, the systems on the primary carrier and the secondary carrier are both LTE systems or NR systems.

When the communication system in the embodiments of the present application is applied to an unlicensed spectrum and the networking scenario is SA, the terminal device may access the network through the system on the unlicensed spectrum.

The embodiments of the present application are described with reference to network device and terminal device.

The terminal device may also be referred to as user equipment (UE), access terminal, subscriber unit, user station, mobile station, mobile site, remote station, remote terminal, mobile device, user terminal, terminal, wireless communication device, user agent or user device. The terminal device may be a station (ST) in WLAN, or may be a cellular phone, a cordless phone, a Session Initiation Protocol (SIP) phone, a Wireless Local Loop (WLL) station, a personal digital processing (PDA) device, a handheld device with wireless communication capabilities, a computing device, other processing devices connected to wireless modems, an in-vehicle devices, a wearable device, or next-generation communication system device, such as a terminal device in the fifth-generation communications (5G) network or in the public land mobile network (PLMN) network that evolves in the future.

As an example without limitation, in the embodiments of the present application, the terminal device may also be a wearable device. The Wearable device may also be referred to as a wearable smart device, which is a general term for wearable devices applying intelligence technology to everyday wear, such as glasses, gloves, watches, clothing and shoes. The wearable device may be a portable device that is worn directly on the body or integrated into the user's clothes or accessories. The wearable device may not only a hardware device, but may also achieve powerful functions through software support, data interaction, and cloud interaction. Generalized wearable smart devices may be full-featured, large-sized, and may achieve complete or partial functions independent of smartphones, such as smart watches or smart glasses. Generalized wearable smart devices may only focus on a certain type of application functions, and need to cooperate with other devices such as smartphones, for example, various smart bracelets and smart jewelry for body monitoring.

The network device may be a device for communicating with a mobile device, and may be an access point (AP) in WLAN, a base transceiver station (BTS) in GSM or CDMA, or a NodeB (NB) in WCDMA, and may also be an evolutional Node B (eNB or eNodeB) in LTE, or a relay station or an access point, or a vehicle-mounted device, a wearable device, and a network device in the future 5G network or in the evolved PLMN network, or the like.

In the embodiments of the present application, the network device provides services for the cell. The terminal device may communicate with the network device through transmission resources (for example, frequency domain resources or spectrum resources) used in the cell. The cell may be a cell corresponding to the network device (e.g., a base station). The cell may belong to a macro base station or a base station corresponding to a small cell. The small cell herein may include a metro cell, a micro cell, a pico cell, a femto cells, and the like. These small cells have the characteristics of small coverage and low transmission power, and are suitable for providing high-speed data transmission services.

In the embodiments of the present application, multiple cells may work on the same frequency at the same time on carriers in LTE system or 5G system. In some special scenarios, the concepts of the carrier and the cell may be considered equivalent. For example, in the carrier aggregation (CA) scenario, when a secondary carrier is configured for a UE, a carrier index of the secondary carrier and a cell identify (Cell ID) of a secondary cell working on the secondary carrier are carried at the same time. In such case, the concept of carrier and cell may be considered equivalent, for example, UE accessing a carrier is equivalent to accessing a cell.

It should be noted that, the downlink physical channel may include PDCCH (Physical Downlink Control Channel), EPDCCH (Enhanced Physical Downlink Control Channel), and PDSCH (Physical Downlink Shared Channel), PHICH (Physical Hybrid ARQ Indicator Channel), PMCH (Physical Multicast Channel), PBCH (Physical Broadcast Channel), and the like. The downlink reference signal may include a downlink synchronization signal, a PT-RS (Phase Tracking Reference Signal), a DMRS (Demodulation Reference Signal), a CSI-RS (Channel State Information-Reference Signal), and the like. Herein, the downlink synchronization signal may be used by a communication device for network accessing and radio resource management measurement, the downlink DMRS may be used for demodulation of the downlink channel, the CSI-RS may be used for downlink channel measurement, and the PT-RS may be used for downlink time-frequency synchronization or phase tracking. It should be understood that the embodiments of the present application may include downlink physical channels or downlink reference signals with the same name and different functions as described above, and may also include downlink physical channels or downlink reference signals with different names and the same function as described above. The application is not limited thereto.

It should be noted that, the uplink physical channel in the embodiments of the present application may include a physical random access channel (PRACH), a physical uplink control channel (PUCCH), a physical uplink shared channel (PUSCH) and the like. The uplink reference signal may include an uplink demodulation reference signal (DMRS), a sounding reference signal (SRS), a phase tracking reference signal (PT-RS) and the like. In an embodiment, the uplink DMRS can be used for demodulation of uplink channel, the SRS can be used for measurement of uplink channel, and the PT-RS can be used for uplink time-frequency synchronization or phase tracking. It should be understood that the embodiments of the present application may include uplink physical channels or uplink reference signals with the same name and different functions as described above, and may also include uplink physical channels or uplink reference signals with different names and the same function as described above. The application is not limited thereto.

Figure 1:
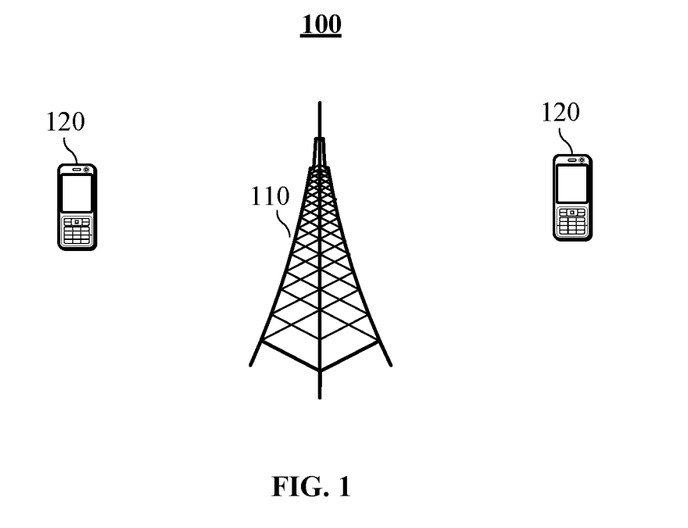
FIG. 1 is a schematic diagram illustrating a communication system according to an embodiment of the present application.

FIG. 1 is a schematic diagram illustrating a communication system according to an embodiment of the present application. As shown in FIG. 1, the communication system 100 includes a network device 110 and a terminal device 120.

The network device 110 may be any implementation manner of the foregoing network devices, and the terminal device 120 may be any implementation manner of the foregoing terminal devices, which will not be repeated here.

It should be understood that the communication system 100 may be a PLMN network, a D2D network, an M2M network, or other networks. FIG. 1 is only a simplified schematic diagram of an example, and the network may also include other network devices, which are not shown in FIG. 1.

The frequency domain resources used for wireless communication in the embodiments of the present application will be described in detail below.

In the embodiments of the present application, the frequency domain resources used by the network device and the terminal device for wireless communication (for example, uplink transmission or downlink transmission) are frequency domain resources used based on a contention mechanism, for example, the unlicensed spectrum resources.

For example, the network device and/or the terminal device may detect whether a frequency domain resource with a certain bandwidth (e.g., 20 MHz) is currently in an idle state, in other words, whether the frequency domain resource is used by other devices.

If the frequency domain resource is in the idle state, or in other words, the frequency domain resource is not used by other devices, the network device and/or the terminal device may use the frequency domain resource for communication, for example, for uplink transmission or downlink transmission.

If the frequency domain resource is not in the idle state, or in other words, the frequency domain resource is already used by other devices, the network device and/or the terminal device cannot use the frequency domain resource.

By way of example without limitation, in the embodiments of the present application, the frequency domain resource used by the communication system 100 (or in other words, the frequency domain resource used by the network device and the terminal device based on the contention mechanism) may also be licensed spectrum resource, that is, the communication system 100 in the embodiments of the present application is a communication system capable of using a licensed frequency band, and each communication device (network device and/or terminal device) in the communication system 100 may use the frequency domain resource of the licensed frequency band in a contention manner.

The "licensed frequency domain resource" may also be referred to as "licensed spectrum resource" or "licensed carrier", which refers to frequency domain resources that can be used only after approval by the national or local wireless committee. The licensed frequency domain resource cannot be shared between different systems such as LTE system and WiFi system, or, between systems of different service providers.

The licensed spectrum resources may be delineated by the government's radio management committee and have special-purpose spectrum resources, such as those used by mobile operators, civil aviation, railways, and police. Due to policy exclusivity, the service quality of the licensed spectrum resources can be generally guaranteed, and it is relatively easy to perform scheduling control.

Optionally, in the embodiments of the present application, the frequency domain resource used by the communication system 100 (or in other words, the frequency domain resource used by the network device and the terminal device based on the competition mechanism) may be unlicensed frequency domain resource.

The "unlicensed frequency domain resource" may also be referred to as "unlicensed spectrum resource" or "unlicensed carrier", which refers to resources on unlicensed frequency bands that can be shared by respective communication devices. In an embodiment, the "resources on unlicensed frequency bands that can be shared" may refer to a situation as follow. Restrictions on use of a specific frequency spectrum may be defined only in some indicators such as the transmission power and out-of-band leakage, so as to ensure basic coexistence requirements are met between multiple devices that jointly use the frequency band. Service provides may use unlicensed frequency band resources to achieve the purpose of network capacity distribution, but need to comply with the regulatory requirements for unlicensed frequency band resources in different regions and different spectrums. These requirements are usually formulated to protect public systems such as radar, and to ensure that multiple systems do not cause harmful effects and coexist with each other as much as possible, including transmit power limits, out-of-band leakage indicators, indoor and outdoor use restrictions, and some additional coexistence strategies in certain regions. For example, respective communication devices may utilize the frequency domain resource by adopting a contention manner or a listening method, for example, using a method specified by LBT.

The unlicensed spectrum resource may be a spectrum resource delineated by relevant government departments, without limiting the radio technology, operating companies, and service life, and without guarantying service quality of the frequency band. Communication devices using the unlicensed spectrum resources only need to meet the requirements of indicators such as transmission power and out-of-band leakage for free use. Typical systems that use unlicensed spectrum resources for communication include the Wi-Fi system.

As an example without limitation, in the embodiments of the present application, the unlicensed spectrum resource may include a frequency band around 5 Giga Hertz (GHz), a frequency band around 2.4 GHz, a frequency band around 3.5 GHz, a frequency band around 37 GHz, and a frequency band around 60 GHz.

Figure 2:
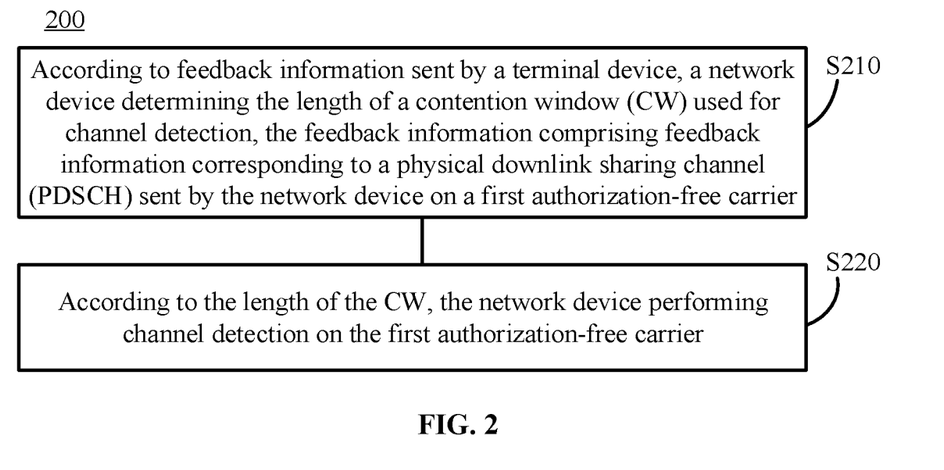
FIG. 2 is a schematic flowchart illustrating a method for adjusting CW according to an embodiment of the present application.
Figure 3:
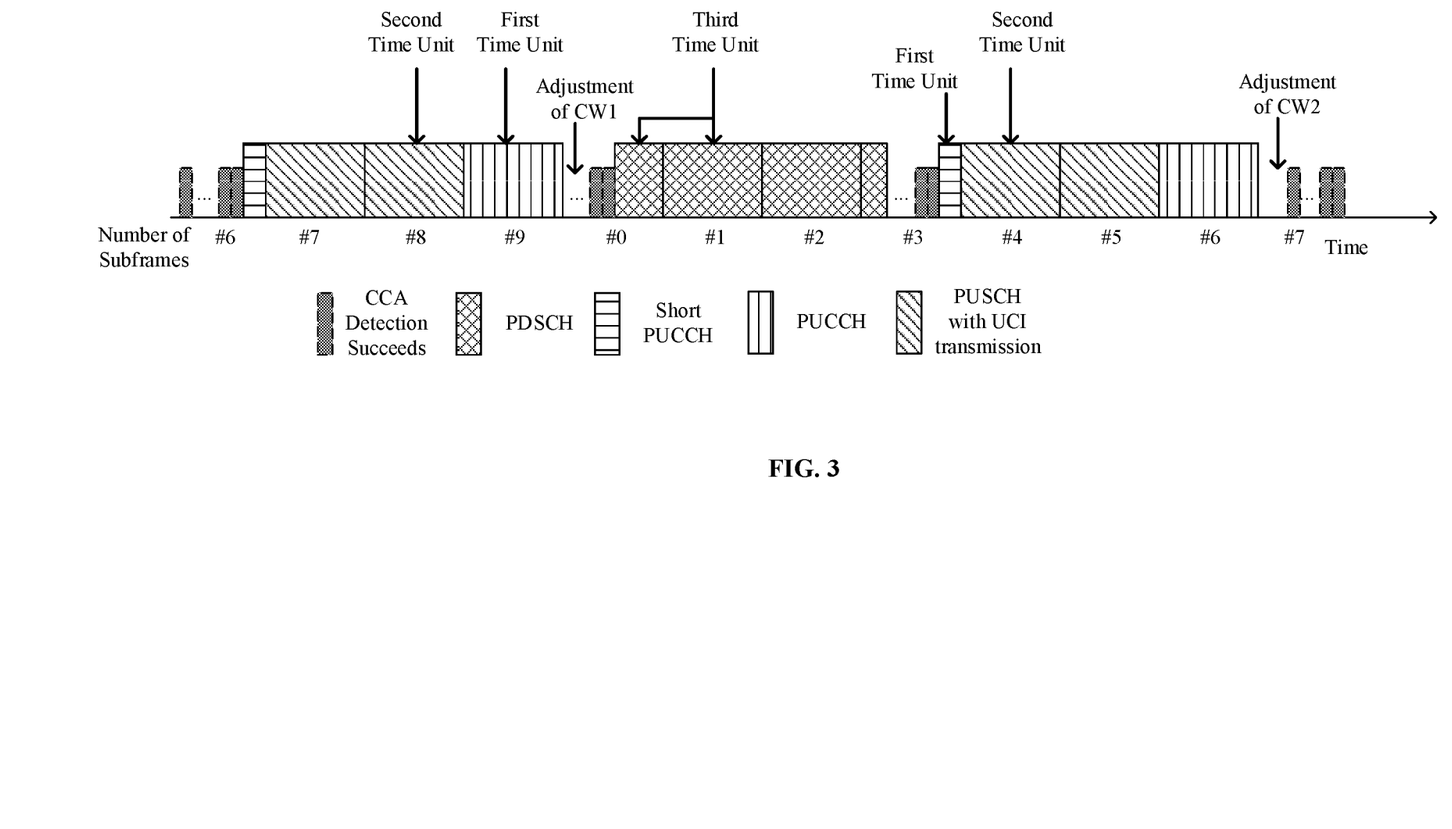
FIG. 3 is a schematic diagram illustrating an example of the method for adjusting CW according to an embodiment of the present application.

The following describes the method for adjusting CW according to an embodiment of the present application with reference to FIGS. 2 to 3. It should be understood that FIGS. 2 to 3 are schematic flowcharts of the method for adjusting CW according to an embodiment of the present application, illustrating detailed communication steps or operations of the method, but these steps or operations are only examples. The embodiments of the present application may also include other operations or variations of various operations in FIGS. 2 to 3.

In addition, the steps in FIGS. 2 to 3 may be performed in a different order from that shown in FIGS. 2 to 3, and it may not be necessary to perform all the operations in FIGS. 2 to 3.

FIG. 2 is a schematic flowchart illustrating a method 200 for adjusting CW according to an embodiment of the present application. As shown in FIG. 2, the method 200 may include following steps.

In S210, the network device determines, according to feedback information sent by the terminal device, a length of CW used for channel detection, the feedback information including feedback information corresponding to the PDSCH sent by the network device on a first carrier, and the first carrier being an unlicensed carrier.

In S220, the network device performs channel detection on the first carrier according to the length of CW.

Specifically, the network device may determine the length of CW used for channel detection before starting to perform channel detection on the first carrier in the unlicensed carrier. For example, the network device may determine the length of CW according to the feedback information corresponding to the PDSCH sent on the first carrier. In an embodiment, the feedback information corresponding to the PDSCH includes ACK information and NACK information. For example, if the PDSCH is correctly decoded, the feedback information corresponding to the PDSCH is ACK information; if The PDSCH is not correctly decoded, the feedback information corresponding to the PDSCH is NACK information. The ACK information, the NACK information and the like may be sent to the network device through an uplink PUSCH or PUCCH channel.

Optionally, the network device may increase the length of CW when the proportion or the number of NACK in the feedback information is relatively large, or decrease the length of CW when the proportion or the number of NACK in the feedback information is relatively small, thereby enabling flexible adjustment of the CW and, further, enabling fair coexistence between different communication systems (e.g., NR-U system, LAA-LTE system and WIFI system).

Moreover, the network device may perform channel detection according to the determined length of CW for channel detection. If the channel detection is successful, the network device may obtain an opportunity of downlink transmission. Otherwise, the network device cannot perform downlink transmission. In an embodiment, the opportunity of downlink transmission may include a time unit for continuous transmission of the network device, and one time unit may include one or more subframes, may also be defined as one or more time slots, may also be defined as one or more symbols, may also be defined as one or more mini-slots, or the like. A start time unit and/or an end time unit of one downlink transmission opportunity may be a complete time unit, a partial time unit or the like.

Optionally, after the channel detection on the first carrier is successful, the network device may perform transmission of downlink physical channel on the first carrier. Optionally, in an embodiment of the present application, the number of the terminal devices may be one or more, that is, the feedback information used for determining the length of CW may be fed back by one or more terminal devices. Embodiments of the present application are not limited thereto.

Optionally, in an embodiment of the present application, the feedback information may include at least one of hybrid automatic repeat request (HARQ) information, channel quality indication (CQI), precoding matrix indication (PMI) or codebook, rank indication (RI), scheduling request (SR), or other feedback information fed back by the terminal device. Embodiments of the present application are not limited thereto.

Optionally, in an embodiment of the present application, if the feedback information is HARQ information, the HARQ information includes at least one of the following states:

positive acknowledgment (ACK), negative acknowledgment (NACK), discontinuous transmission (DTX) information, NACK or DTX information and any information.

Optionally, if the terminal device correctly receives the PDSCH sent by the network device, the ACK is fed back. Alternatively, if the terminal device does not correctly receive the PDSCH sent by the network device, the NACK is fed back. Alternatively, if the terminal device does not receive the uplink grant (UL-grant) indicating the PDSCH, the terminal device may not feed back or may feed back the discontinuous transmission (DTX) information to the network device.

Optionally, in some embodiments, the feedback information may be transmitted through the first carrier, that is, the PDSCH and the feedback information corresponding to the PDSCH may be transmitted through the same unlicensed carrier. Alternatively, the feedback information may be transmitted through a second carrier other than the first carrier. For example, the feedback information may be transmitted through an unlicensed carrier other than the first carrier, that is, the carriers for transmitting the feedback information corresponding to the PDSCH and the PDSCH may be different. Alternatively, the feedback information may also be transmitted through a licensed carrier, that is, the network device may transmit the PDSCH through the unlicensed carrier, and the terminal device may transmit the feedback information corresponding to the PDSCH through the licensed carrier.

Optionally, if the feedback information is transmitted through the unlicensed carrier, the method 200 may further include:

making the feedback information not counted when the network device fails to detect the feedback information on the unlicensed carrier; or counting the feedback information as NACK when the network device detects the feedback information on the unlicensed carrier and a state of the feedback information is one of DTX information, NACK or DTX information and any information.

In an embodiment, the unlicensed carrier may be the same unlicensed carrier as the first carrier, or may be an unlicensed carrier different from the first carrier. If the network device does not receive feedback information on the unlicensed carrier, the feedback information is not counted, that is, a count value of NACK is not increased. Alternatively, if the network device receives NACK on the unlicensed carrier, the count value of NACK is increased. Alternatively, if the network device receives any one of DTX, NACK/DTX or any information on the unlicensed carrier, such feedback information may be counted as NACK, and the count value of NACK is increased.

For example, if the network device configures two terminal devices to transmit PUCCH on time slot 1, if the terminal device 1 fails to LBT on the time slot 1, the terminal device 1 does not send PUCCH on the time slot 1; and if the terminal device 2 successes in LBT on the time slot 1, the terminal device 2 sends PUCCH on the time slot 1. Therefore, the network device cannot receive the feedback information of the terminal device 1 on the time slot 1, so the feedback information corresponding to the terminal device 1 is not counted. For the terminal device 2, the network device may determine the count value of NACK according to a status of the feedback information returned by the terminal device 2. For example, if the feedback information is ACK, the NACK is not counted; or if the feedback information is any one of NACK, DTX, NACK/DTX or any, then the feedback information is determined as NACK, and the count value of NACK is increased.

Optionally, in some embodiments, S210 may specifically include:

determining, by the network device, to increase the length of CW when a proportion of NACK included in the feedback information is greater than or equal to a first preset value or a number of NACK included in the feedback information is greater than or equal to a second preset value; or determining, by the network device, to decrease or keep the length of CW when the proportion of NACK included in the feedback information is smaller than the first preset value or the number of NACK included in the feedback information is smaller than the second preset value.

Specifically, when the proportion or the number of NACK in the feedback information of the terminal device is greater than or equal to the preset threshold, the channel quality may be poor. In this case, the network device may increase the length of CW, that is, set aside longer time of communication resources for data communication by other communication systems. Alternatively, if the proportion or the number of NACK in the feedback information is less than the preset threshold, a load on the channel may be small. So the network device may reduce the length of CW, that is, access to the channel for data communication, thereby enabling fair coexistence between multiple communication systems.

Optionally, in an embodiment of the present application, the length of CW may be linearly increased, for example, by adding a fixed window length based on the original length of CW, or by multiplying the original length of CW by a certain ratio (e.g., 1.1 or 1.2). Alternatively, the length of CW may also be increased exponentially, for example, by a power of 2. Similarly, the length of CW may be linearly decreased or exponentially decreased. Moreover, the length of CW may also be decreased by being restored to an initial value of the CW. Embodiments of the application are not limited thereto.

Optionally, in an embodiment of the present application, the first preset value may be 80%, or may be other ratios, which is not limited by the embodiments of the present application.

Optionally, in some embodiments, the feedback information includes all or part of feedback information transmitted in a physical uplink control channel PUCCH on a first time unit, the first time unit being on a time unit the first carrier, or a time unit on a second carrier other than the first carrier.

In other words, the feedback information may be transmitted in a PUCCH on the first time unit, and the PUCCH may be transmitted on an unlicensed carrier or may be transmitted on a licensed carrier. The feedback information that is transmitted in the PUCCH on the first time unit may include the feedback information corresponding to the PDSCH on the unlicensed carrier, or may also include the feedback information corresponding to the PDSCH on the licensed carrier. Optionally, in an embodiment of the present application, the feedback information used for adjusting the length of CW includes only the feedback information corresponding to the PDSCH on the unlicensed carrier, that is, not all the feedback information transmitted on the PUCCH can be used for adjusting the length of CW.

It should be understood that the first time unit may be a time unit on the first carrier, that is, the feedback information may be transmitted on the first time unit on the first carrier. Alternatively, the first time unit may also be a time unit on a second carrier different from the first carrier, that is, the feedback information may be transmitted on the first time unit on the second carrier. In an embodiment, the second carrier is an unlicensed carrier different from the first carrier, or the second carrier is a licensed carrier.

It should also be understood that, in an embodiment of the present application, the first time unit may be any time domain resource used for transmitting the PUCCH, for example, one or more time slots, or one or more subframes, or one or more symbols, or the like. Embodiments of the present application are not limited thereto.

Optionally, the time length of one PUCCH may also be one or more symbols. Optionally, the number of symbols included in one PUCCH may be one of 1, 2, 4, 5, 6, 7, 8, 9, 10, 11, 12, 13, 14. Optionally, when the length of one PUCCH is one or two symbols, it is called a short PUCCH.

Optionally, in some embodiments, the first time unit may include:

all or part of a time unit used for transmitting the PUCCH in a last uplink transmission before the network device determines the length of CW; and/or all or part of a time unit used for transmitting the PUCCH in a second to last uplink transmission before the network device determines the length of CW.

It should be understood that the latest uplink transmission before the network device determines the length of CW can be understood as the latest uplink transmission (referred to as uplink transmission 1) before the adjustment of CW, that is, there is no uplink transmission between the uplink transmission 1 and the adjustment of CW. The second to last uplink transmission before the network device determines the length of CW is the latest uplink transmission (referred to as uplink transmission 2) before the uplink transmission 1, that is, there is no uplink transmission between the uplink transmission 1 and the uplink transmission 2.

It should be understood that the PUCCH transmitted by the first time unit may be one or more. For example, multiple terminal devices may simultaneously transmit the PUCCH on the first time unit, that is, the time unit used by the multiple terminals to transmit the PUCCH is the same, while the time domain location, and/or the frequency domain location, and/or the code domain location may be different. For example, a terminal device 1 transmits a PUCCH through the first time unit on the first carrier, and a terminal device 2 transmits a PUCCH through the first time unit on a carrier other than the first carrier (e.g., another unlicensed carrier or a licensed carrier). For another example, the terminal device 1 and the terminal device 2 respectively transmit respective PUCCHs by code division on the same frequency domain resource through the first time unit on the first carrier.

It should be understood that the first time unit may be a time unit all used for PUCCH transmission, or may be a time unit partially used for PUCCH transmission, which is not limited in this application.

In some specific embodiments, the first time unit includes:

a headmost time unit used for transmitting the PUCCH in the last uplink transmission before the network device determines the length of CW; and/or a last time unit used for transmitting the PUCCH in the second to last uplink transmission before the network device determines the length of CW.

Optionally, the first time unit is a time unit in which a PUCCH demodulation result is effectively obtained. In other words, the network device has completed demodulation of the PUCCH transmitted on the first time unit before determining the length of CW, so that the size of CW can be determined based on the demodulation result.

For example, assuming that the network device schedules PUCCH transmissions on the headmost time unit and the last time unit in uplink transmission 1, and also schedules PUCCH transmissions on the headmost time unit and the last time unit in uplink transmission 2. The network device determines the CW for channel detection after the end of the uplink transmission 1, so as to perform downlink transmission after the channel detection succeeds. In an embodiment, assuming that the network device has not completed the demodulation of PUCCH transmitted on the last time unit in the uplink transmission 1 when determining the CW, but has completed the demodulation of PUCCHs on the headmost time unit in the uplink transmission 1 as well as on the headmost time unit and the last time unit in the uplink transmission 2, then the first time unit may include at least one of the time units in which the PUCCH demodulation has been completed (i.e., the headmost time unit in the uplink transmission 1, the headmost time unit and the last time unit in the uplink transmission 2). Optionally, the first time unit includes the headmost time unit in the uplink transmission 1 and/or the last time unit in the uplink transmission 2.

Optionally, in some other embodiments, the feedback information includes all or part of feedback information transmitted in a physical uplink shared channel (PUSCH) on a second time unit, the second time unit being a time unit on the first carrier or a time unit on a third carrier other than the first carrier.

In other words, the feedback information may be transmitted in the PUSCH on the second time unit, where the PUSCH may be transmitted on an unlicensed carrier, or may be transmitted on a licensed carrier. The feedback information transmitted in the PUSCH on the second time unit may include the feedback information corresponding to the PDSCH on the licensed carrier, or may also include the feedback information corresponding to the PDSCH on the licensed carrier. Optionally, in an embodiment of the present application, the feedback information used for adjusting the length of CW may include only the feedback information corresponding to the PDSCH on the unlicensed carrier, that is, not all the feedback information transmitted on the PUSCH may be used for adjusting the length of CW.

It should be noted that the second time unit may be a time unit on the first carrier, that is, the feedback information may be transmitted on the second time unit on the first carrier. Alternatively, the second time unit may also be a time unit on a third carrier different from the first carrier, that is, the feedback information may be transmitted on the second time unit of an unlicensed carrier different from the first carrier. Alternatively, the feedback information may be transmitted on the second time unit on a licensed carrier.

It should be understood that, in an embodiment of the present application, the second time unit may be any time domain resource for transmitting the PUSCH, for example, one or more time slots, or one or more subframes, or one or more symbols, or the like. Embodiments of the present application are not limited thereto.

Optionally, in some embodiments, the second time unit includes:

all or part of a time unit used for transmitting the PUSCH including the feedback information in a last uplink transmission before the network device determines the length of CW; and/or all or part of a time unit used for transmitting the PUSCH including the feedback information in a second to last uplink transmission before the network device determines the length of CW.

It should be understood that the PUSCH carrying the feedback information transmitted by the second time unit may be one or more. For example, multiple terminal devices may simultaneously transmit the PUSCH on the second time unit, that is, the time unit used by the terminal devices for transmitting the PUSCH carrying the feedback information is the same, while the time domain location and/or the frequency domain location may be different. For example, the terminal device 1 transmits a PUSCH carrying feedback information through the second time unit on the first carrier, and the terminal device 2 transmits a PUSCH carrying feedback information through the second time unit on a carrier other than the first carrier (e.g., another unlicensed carrier or a licensed carrier). For another example, assuming that the second time unit includes 14 symbols, the terminal device 1 transmits the PUSCH carrying the feedback information through the first 7 symbols on the second time unit, and the terminal device 2 transmits the PUSCH carrying the feedback information through the last 7 symbols on the second time unit.

It should be understood that the second time unit may be a time unit all used for PUSCH transmission, or may be a time unit partially used for PUSCH transmission, which is not limited in this application.

It should also be understood that the feedback information may be carried on only part of the PUSCH in the PUSCH transmitted on the second time unit, which is not limited in this application.

In a specific embodiment, the second time unit includes:

a headmost time unit used for transmitting the PUSCH including the feedback information in the last uplink transmission before the network device determines the length of CW; and/or a last time unit used for transmitting the PUSCH including the feedback information in a second to last uplink transmission before the network device determines the length of CW.

Optionally, the second time unit is a time unit in which a demodulation result of the feedback information carried on the PUSCH is effectively obtained. In other words, the network device has completed the demodulation of feedback information transmitted on the second time unit before determining the length of CW, so that the size of CW can be determined based on the demodulation result.

For example, assuming that the network device schedules transmissions of PUSCHs carrying feedback information on the headmost time unit and the last time unit in uplink transmission 1, and also schedules transmissions of PUSCHs carrying feedback information on the headmost time unit and the last time unit in uplink transmission 2. The network device determines the CW for channel detection after the end of the uplink transmission 1, so as to perform downlink transmission after the channel detection succeeds. In an embodiment, assuming that the network device has not completed the demodulation of feedback information transmitted on the last time unit in the uplink transmission 1 when determining the CW, but has completed the demodulation of feedback information on the headmost time unit in the uplink transmission 1 as well as on the headmost time unit and the last time unit in the uplink transmission 2, then the second time unit may include at least one of the time units in which the demodulation of feedback information has been completed (i.e., the headmost time unit in the uplink transmission 1, the headmost time unit and the last time unit in the uplink transmission 2). Optionally, the second time unit includes the headmost time unit in the uplink transmission 1 and/or the last time unit in the uplink transmission 2.

Optionally, in some embodiments, the feedback information includes feedback information corresponding to PDSCH on a third time unit.

Optionally, the network device may send the PDSCH to the terminal device through the third time unit on the first carrier. Furthermore, the network device may receive, on the first time unit of the first carrier or the second carrier, feedback information corresponding to the PDSCH which is transmitted in PUCCH by the terminal device. Alternatively, the network device may also receive, on second first time unit of the first carrier or the third carrier, feedback information corresponding to the PDSCH which is transmitted in PUCCH by the terminal device. Then the network device may determine the length of CW according to the state of the feedback information, and further, may perform channel detection according to the length of CW.

Optionally, the feedback information corresponding to the PDSCH on the third time unit may be transmitted through a licensed carrier, or may be transmitted through an unlicensed carrier.

As can be seen from the foregoing description, the feedback information corresponding to the PDSCH may be transmitted through PUCCH or a PUSCH. Therefore, the PUCCH or the PUSCH may be transmitted through an unlicensed carrier or a licensed carrier.

It should be understood that the third time unit may be a time unit all used for PDSCH transmission, or may be a time unit partially used for PDSCH transmission, which is not limited in this application.

Optionally, in some embodiments, the third time unit may include:

a headmost time unit in a last downlink transmission performed on the first carrier before the network device determines the length of CW; or two preceding time units in the last downlink transmission performed on the first carrier before the network device determines the length of CW.

It should be understood that the latest downlink transmission before the network device determines the length of CW can be understood as the last downlink transmission (referred to as downlink transmission 1) before the adjustment of CW, that is, there is no downlink transmission between the downlink transmission 1 and the adjustment of CW.

Optionally, the third time unit is a time unit in which the feedback information corresponding to the PDSCH is effectively obtained. In other words, the network device has completed demodulation of HARQ feedback information corresponding to the PDSCH transmitted on the third time unit before determining the length of CW, so that the size of CW can be determined according to the demodulation result.

Optionally, if the headmost time unit in the latest downlink transmission (i.e., the downlink transmission 1) is a complete time unit, the feedback information includes feedback information corresponding to the PDSCH transmitted on the headmost time unit in the downlink transmission 1. Optionally, if the headmost time unit in the downlink transmission 1 is a partial time unit, the feedback information includes feedback information corresponding to the PDSCH transmitted on the two preceding time units in the downlink transmission 1.

In summary, in an embodiment of the present application, the feedback information used for adjusting the length of CW may be transmitted in PUCCH or PUSCH, where the PUCCH or the PUSCH may be transmitted through an unlicensed carrier, or may be transmitted through a licensed carrier. The feedback information that is transmitted by the PUCCH or the PUSCH on the unlicensed carrier may be the feedback information corresponding to the PDSCH on the unlicensed carrier, or may be the feedback information corresponding to the PDSCH on the licensed carrier. The feedback information used for adjusting the length of CW may include only feedback information corresponding to the PDSCH on the unlicensed carrier.

Hereinafter, embodiments of the present application will be exemplified in conjunction with FIG. 3. As shown in FIG. 3, on the first carrier, it is assumed that the uplink transmission 2 includes subframes #6 to #9, the downlink transmission 1 includes subframes #0 to #3, and the uplink transmission 1 includes subframes #3 to #6, where subframe #3 has both downlink transmission and uplink transmission. For uplink transmission 2, subframes #6 and #9 are subframes for transmitting PUCCH, subframes #7 and #8 are subframes for transmitting PUSCH carrying feedback information. For uplink transmission 1, subframes #3 and #6 are subframes for transmitting PUCCH, subframes #4 and #5 are subframes for transmitting PUSCH carrying feedback information. For downlink transmission 1, subframes #0 and #3 are partial subframes for transmitting PDSCH, and subframes #1 and #2 are complete subframes for transmitting PDSCH. The network device may obtain feedback information corresponding to the PDSCH on the first carrier by using at least one of the following manners (1)-(5), thereby determining CW2 for channel detection:

(1) feedback information transmitted on the PUCCH in the subframe #3 and/or the subframe #6 of the uplink transmission 1 (for example, feedback information transmitted on the PUCCH in the subframe #3);

(2) feedback information transmitted on the PUCCH in subframe #6 and/or subframe #9 of the uplink transmission 2 (for example, feedback information transmitted on the PUCCH in subframe #9);

(3) feedback information transmitted on the PUSCH carrying UCI (uplink control information) in the subframe #4 and/or the subframe #5 of the uplink transmission 1 (for example, the feedback information transmitted on the PUSCH in the subframe #4, where the subframe #4 is the headmost time unit of the PUSCH transmission carrying the feedback information in the uplink transmission 1);

(4) feedback information transmitted on the PUSCH carrying UCI in the subframe #7 and/or the subframe #8 of the uplink transmission 2 (for example, feedback information transmitted on the PUSCH in the subframe #8, where the subframe #8 is the last time unit of the PUSCH transmission carrying the feedback information in the uplink transmission 2);

(5) feedback information corresponding to the PDSCH on at least one of the subframes #0 to #3 of the downlink transmission 1 (for example, feedback information corresponding to the PDSCH in the subframes #0 and #1, where the subframes #0 and #1 are the two preceding time units used for PDSCH transmission in the downlink transmission 1).

The method embodiments of the present application are described in detail above with reference to FIGS. 2 to 3. The device embodiments of the present application will be described in detail below with reference to FIGS. 4 to 5. It should be understood that the device embodiments and the method embodiments correspond to each other and, thus, similar description may refer to the method embodiments.

Figure 4:
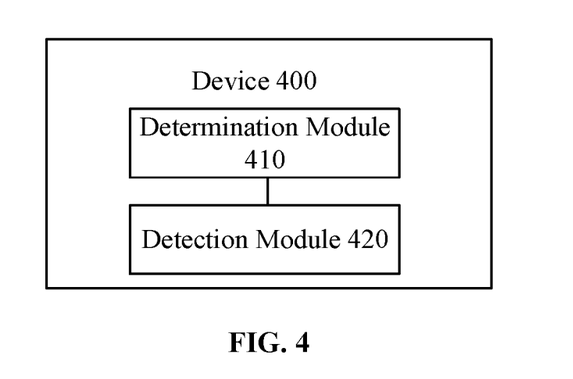
FIG. 4 is a block diagram illustrating a device for adjusting CW according to an embodiment of the present application.

FIG. 4 is a block diagram illustrating a device for adjusting CW according to an embodiment of the present application. The device 400 of FIG. 4 includes:

a determination module 410, configured to determine, according to feedback information sent by the terminal device, a length of CW used for channel detection, the feedback information including feedback information corresponding to a PDSCH sent by the device on a first carrier, and the first carrier being an unlicensed carrier; and a detection module 420, configured to perform channel detection on the first carrier according to the length of CW.

Optionally, in some embodiments, the feedback information includes all or part of feedback information transmitted in a physical uplink control channel (PUCCH) on a first time unit, the first time unit being a time unit on the first carrier or a time unit on a second carrier other than the first carrier.

Optionally, in some embodiments, the second carrier is an unlicensed carrier different from the first carrier; or the second carrier is a licensed carrier.

Optionally, in some embodiments, the first time unit includes:

all or part of a time unit used for transmitting the PUCCH in a last uplink transmission before the device determining the length of CW; and/or all or part of a time unit used for transmitting the PUCCH in a second to last uplink transmission before the device determining the length of CW.

Optionally, in some embodiments, the first time unit includes:

a headmost time unit used for transmitting the PUCCH in the last uplink transmission before the device determining the length of CW; and/or a last time unit used for transmitting the PUCCH in the second to last uplink transmission before the device determining the length of CW.

Optionally, in some embodiments, the feedback information includes all or part of feedback information transmitted in a physical uplink shared channel (PUSCH) on a second time unit, the second time unit being a time unit on the first carrier or a time unit on a third carrier other than the first carrier.

Optionally, in some embodiments, the third carrier is an unlicensed carrier different from the first carrier; or the third carrier is a licensed carrier.

Optionally, in some embodiments, the second time unit includes:

all or part of a time unit used for transmitting the PUSCH including the feedback information in a last uplink transmission before the device determining the length of CW; and/or all or part of a time unit used for transmitting the PUSCH including the feedback information in a second to last uplink transmission before the device determining the length of CW.

Optionally, in some embodiments, the second time unit includes:

a headmost time unit used for transmitting the PUSCH including the feedback information in the last uplink transmission before the device determining the length of CW; and/or a last time unit used for transmitting the PUSCH including the feedback information in a second to last uplink transmission before the device determining the length of CW.

Optionally, in some embodiments, the feedback information includes feedback information corresponding to a PDSCH on a third time unit.

Optionally, in some embodiments, the third time unit includes:

a headmost time unit in a last downlink transmission performed on the first carrier before the device determining the length of CW; or two preceding time units in the last downlink transmission performed on the first carrier before the device determining the length of CW.

Optionally, in some embodiments, the feedback information corresponding to the PDSCH on the third time unit is transmitted through a licensed carrier.

Optionally, in some embodiments, the feedback information is HARQ information, and the HARQ information includes at least one of following states:

positive acknowledgment (ACK), negative acknowledgment (NACK), discontinuous transmission (DTX) information, NACK or DTX information and any information.

Optionally, in some embodiments, the determination module is further configured to:

determine to increase the length of CW when a proportion of NACK included in the feedback information is greater than or equal to a first preset value or a number of NACK included in the feedback information is greater than or equal to a second preset value; or determine to decrease or keep the length of CW when the proportion of NACK included in the feedback information is smaller than the first preset value or the number of NACK included in the feedback information is smaller than the second preset value.

Optionally, in some embodiments, when the feedback information is transmitted through an unlicensed carrier, the determination module is further configured to:

make the feedback information not counted when the device fails to detect the feedback information on the unlicensed carrier; or count the feedback information as NACK when the device detects the feedback information on the unlicensed carrier and a state of the feedback information is one of DTX information, NACK or DTX information and any information.

Specifically, the device 400 may correspond to (for example, may be provided in or implemented as) the network device described in the foregoing method 200, and each module or unit in the device 400 is configured to execute respective operations or processes performed by the network device in the foregoing method 200, detail of which is omitted here for the sake of avoiding redundancy.

Figure 5:
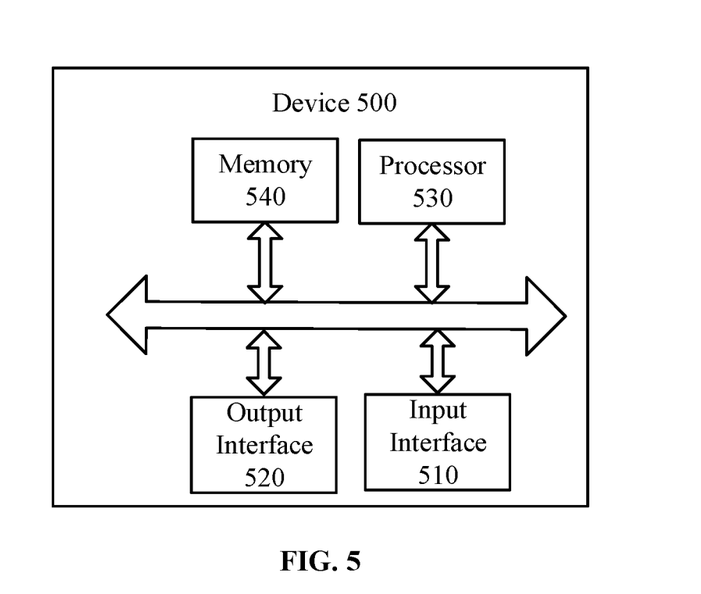
FIG. 5 is a block diagram illustrating a device for adjusting CW according to another embodiment of the present application.

As shown in FIG. 5, an embodiment of the present application further provides a device 500 for adjusting CW, and the device 500 may be the device 400 in FIG. 4, which can be configured to execute operations of the network device corresponding to the method 200 in FIG. 2. The device 500 includes an input interface 510, an output interface 520, a processor 530, and a memory 540. The input interface 510, the output interface 520, the processor 530, and the memory 540 may be connected through a bus system. The memory 540 is configured to store programs, instructions or codes. The processor 530 is configured to execute programs, instructions, or codes in the memory 540 to control the input interface 510 to receive signals, control the output interface 520 to send signals, and complete operations in the foregoing method embodiments.

It should be understood that, in the embodiments of the present application, the processor 530 may be a central processing unit ("CPU"), and the processor 530 may also be other general-purpose processors or digital signal processors (DSP), application specific integrated circuit (ASIC), field programmable gate array (FPGA) or other programmable logic devices, discrete gates or transistor logic devices, discrete hardware components, or the like. The general-purpose processor may be a microprocessor or the processor may also be any conventional processor or the like.

The memory 540 may include a read-only memory and a random access memory, and provide instructions and data to the processor 530. A portion of the memory 540 may also include non-volatile random access memory. For example, the memory 540 may also store information on the type of device.

In the implementation process, content of the above method may be completed by an integrated logic circuit of hardware in the processor 530 or instructions in the form of software. The content of the method disclosed in conjunction with the embodiments of the present application may be directly embodied and completed by a hardware processor, or may be implemented and completed by a combination of hardware and software modules in the processor. The software module may be located in a mature storage medium in the art, such as random access memory, flash memory, read-only memory, programmable read-only memory, electrically erasable programmable memory, or registers. The storage medium may be located in the memory 540, and the processor 530 reads the information from the memory 540 and completes the content of the above method in combination with its hardware. In order to avoid repetition, details thereof are not described here.

In a specific embodiment, the determination module 410 included in the device 400 in FIG. 4 may be implemented by the processor 530 in FIG. 5, and the detection module 420 included in the device 400 in FIG. 4 may be implemented by the input interface 510 and the output interface 520 described in FIG. 5.

Embodiments of the present application also provide a computer-readable storage medium that stores one or more programs, the one or more programs include instructions. The instructions may cause, when executed by a portable electronic device that includes multiple application programs, the portable electronic device to implement the method according to the embodiments shown in FIGS. 2 to 3.

An embodiment of the present application also proposes a computer program including instructions. The computer program may cause, when executed by a computer, the computer to implement the corresponding flow of the method according to the embodiments shown in FIGS. 2 to 3.

Those of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Those of ordinary skill in the art can use different manners to implement the described functions for each specific application, but such implementation should not be considered beyond the scope of this application.

Those skilled in the art can clearly understand that for the convenience and conciseness of the description, the specific working process of the system, device and unit described above may refer to the corresponding process in the foregoing method embodiments, which will not be repeated here.

In the several embodiments provided in this application, it should be understood that the disclosed system, device, and method may be implemented in other manners. For example, the device embodiments described above are only schematic. For example, the division of the units is only a logical function division, and there may be other divisions in actual implementation, for example, multiple units or components may be combined with each other or may be integrated into another system, or some features can be ignored or not implemented. In addition, the displayed or discussed mutual coupling or direct coupling or communication connection may be indirect coupling or communication connection through some interfaces, devices or units, and may be in electrical, mechanical, or other forms.

The units described as separate components may be or may not be physically separated, and the components displayed as units may be or may not be physical units. In other words, they may be located in one place, or may be distributed at multiple network units. Some or all of the units may be selected according to actual needs to achieve the purpose of the solution of this embodiment.

In addition, each functional unit in each embodiment of the present application may be integrated into one processing unit, or each unit may exist alone physically, or two or more units may be integrated into one unit.

If the function is implemented in the form of a software functional unit and sold or used as an independent product, it can be stored in a computer-readable storage medium. Based on such an understanding, the technical solution of the present application may be essentially or a part that contributes to the prior art or a part of the technical solution may be embodied in the form of a software product, and the computer software product is stored in a storage medium, including several instructions to enable a computer device (which may be a personal computer, server, network device, or the like) to perform all or part of the steps of the methods described in the embodiments of the present application. The foregoing storage medium may include U disk, mobile hard disk, read-only memory (ROM), random access memory (RAM), magnetic disk or optical disk and other media that can store program codes.

The above is only the specific implementation of this application, but the protection scope of this application is not limited thereto. Those skilled in the art can easily think of changes or replacements within the technical scope disclosed in this application. It should be covered by the protection scope of this application. Therefore, the protection scope of the present application shall be subject to the protection scope of the claims.

What is claimed is:

1. A method for determining a contention window (CW), comprising:
   determining, by a network device according to feedback information sent by a terminal device, a length of CW used for channel detection, the feedback information comprising feedback information corresponding to a physical downlink shared channel (PDSCH) sent by the network device on a first carrier, and the first carrier being an unlicensed carrier; and
   performing, by the network device, channel detection on the first carrier according to the length of CW,
   wherein the feedback information comprises all or part of feedback information transmitted in a physical uplink shared channel (PUSCH) on a second time unit, the second time unit being a time unit on the first carrier or a time unit on a third carrier other than the first carrier.

2. The method according to claim 1, wherein the feedback information further comprises all or part of feedback information transmitted in a physical uplink control channel (PUCCH) on a first time unit, the first time unit being a time unit on the first carrier or a time unit on a second carrier other than the first carrier.

3. The method according to claim 2, wherein the second carrier is an unlicensed carrier different from the first carrier; or the second carrier is a licensed carrier.

4. The method according to claim 2, wherein the first time unit comprises at least one of:
   all or part of a time unit used for transmitting the PUCCH in a last uplink transmission before the network device determines the length of CW; or
   all or part of a time unit used for transmitting the PUCCH in a second to last uplink transmission before the network device determines the length of CW.

5. The method according to claim 4, wherein the first time unit comprises at least one of:
   a headmost time unit used for transmitting the PUCCH in the last uplink transmission before the network device determines the length of CW; or
   a last time unit used for transmitting the PUCCH in the second to last uplink transmission before the network device determines the length of CW.

6. The method according to claim 1, wherein the third carrier is an unlicensed carrier different from the first carrier; or the third carrier is a licensed carrier.

7. The method according to claim 1, wherein the second time unit comprises at least one of:
   all or part of a time unit used for transmitting the PUSCH including the feedback information in a last uplink transmission before the network device determines the length of CW; or
   all or part of a time unit used for transmitting the PUSCH including the feedback information in a second to last uplink transmission before the network device determines the length of CW.

8. The method according to claim 7, wherein the second time unit comprises at least one of:
   a headmost time unit used for transmitting the PUSCH including the feedback information in the last uplink transmission before the network device determines the length of CW; or
   a last time unit used for transmitting the PUSCH including the feedback information in a second to last uplink transmission before the network device determines the length of CW.

9. A device for determining a contention window (CW), comprising:
   a memory, configured to store instructions; and
   a processor, when executing the instructions, configured to:
   determine, according to feedback information sent by a terminal device, a length of CW used for channel detection, the feedback information comprising feedback information corresponding to a physical downlink shared channel (PDSCH) sent by the device on a first carrier, and the first carrier being an unlicensed carrier; and
   perform channel detection on the first carrier according to the length of CW,
   wherein the feedback information comprises all or part of feedback information transmitted in a physical uplink shared channel (PUSCH) on a second time unit, the second time unit being a time unit on the first carrier or a time unit on a third carrier other than the first carrier.

10. The device according to claim 9, wherein the feedback information further comprises all or part of feedback information transmitted in a physical uplink control channel (PUCCH) on a first time unit, the first time unit being a time unit on the first carrier or a time unit on a second carrier other than the first carrier.

11. The device according to claim 10, wherein the second carrier is an unlicensed carrier different from the first carrier; or the second carrier is a licensed carrier.

12. The device according to claim 10, wherein the first time unit comprises at least one of:
   all or part of a time unit used for transmitting the PUCCH in a last uplink transmission before the device determining the length of CW; or
   all or part of a time unit used for transmitting the PUCCH in a second to last uplink transmission before the device determining the length of CW.

13. The device according to claim 12, wherein the first time unit comprises at least one of:
   a headmost time unit used for transmitting the PUCCH in the last uplink transmission before the device determining the length of CW; or
   a last time unit used for transmitting the PUCCH in the second to last uplink transmission before the device determining the length of CW.

14. The device according to claim 9, wherein the feedback information further comprises feedback information corresponding to a PDSCH on a third time unit.

15. The device according to claim 14, wherein the third time unit comprises:
   a headmost time unit in a last downlink transmission performed on the first carrier before the device determining the length of CW; or two preceding time units in the last downlink transmission performed on the first carrier before the device determining the length of CW.

16. The device according to claim 14, wherein the feedback information corresponding to the PDSCH on the third time unit is transmitted through a licensed carrier.

17. The device according to claim 9, wherein the feedback information is hybrid automatic repeat request (HARQ) information, and the HARQ information comprises at least one of following states:

positive acknowledgment (ACK), negative acknowledgment (NACK), discontinuous transmission (DTX) information, NACK or DTX information and any information.

18. The device according to claim 9, wherein the processor is further configured to:

determine to increase the length of CW when a proportion of NACK included in the feedback information is greater than or equal to a first preset value or a number of NACK included in the feedback information is greater than or equal to a second preset value; or determine to decrease or keep the length of CW when the proportion of NACK included in the feedback information is smaller than the first preset value or the number of NACK included in the feedback information is smaller than the second preset value.

19. The device according to claim 9, wherein when the feedback information is transmitted through an unlicensed carrier, the processor is further configured to:

make the feedback information not counted when the device fails to detect the feedback information on the unlicensed carrier; or count the feedback information as NACK when the device detects the feedback information on the unlicensed carrier and a state of the feedback information is one of DTX information, NACK or DTX information and any information.

* * * * *